(12) United States Patent
Kim

(10) Patent No.: US 8,571,713 B2
(45) Date of Patent: Oct. 29, 2013

(54) ROBOT AND METHOD THEREOF

(75) Inventor: Kyung Rock Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 497 days.

(21) Appl. No.: 12/616,297

(22) Filed: Nov. 11, 2009

(65) Prior Publication Data
US 2010/0145518 A1    Jun. 10, 2010

(30) Foreign Application Priority Data
Dec. 10, 2008 (KR) .......................... 10-2008-125000

(51) Int. Cl.
*G05B 19/418*   (2006.01)
*G06F 19/00*    (2011.01)

(52) U.S. Cl.
USPC ........... 700/258; 700/193; 700/252; 700/254; 700/245; 700/262

(58) Field of Classification Search
None
See application file for complete search history.

(56) References Cited

U.S. PATENT DOCUMENTS

| | | | | |
|---|---|---|---|---|
| 5,796,354 | A * | 8/1998 | Cartabiano et al. | 341/22 |
| 5,984,880 | A * | 11/1999 | Lander et al. | 600/595 |
| 6,244,644 | B1 * | 6/2001 | Lovchik et al. | 294/111 |
| 7,296,835 | B2 * | 11/2007 | Blackwell et al. | 294/111 |
| 2002/0081112 | A1 * | 6/2002 | Morohashi et al. | 396/312 |
| 2005/0151673 | A1 * | 7/2005 | Mercier | 341/20 |
| 2006/0011010 | A1 * | 1/2006 | Koyama et al. | 74/490.05 |
| 2006/0200349 | A1 * | 9/2006 | Ho et al. | 704/251 |
| 2008/0150899 | A1 * | 6/2008 | Lin | 345/168 |
| 2008/0284727 | A1 * | 11/2008 | Ishikawa | 345/156 |

* cited by examiner

*Primary Examiner* — Ian Jen
(74) *Attorney, Agent, or Firm* — Staas & Halsey LLP

(57) ABSTRACT

Disclosed herein are a robot generating a message using a robot hand, and a control method thereof. When a user types characters using a robot hand, a hand body part and a finger part of the robot hand output displacement signals and a command reading unit accordingly generates a message corresponding to the displacement signals. The message is transmitted to a robot controlling unit. In addition, the message is outputted by sound or displayed to be easily checked by the user.

20 Claims, 9 Drawing Sheets

ROBOT AND METHOD THEREOF

CROSS-REFERENCE TO RELATED APPLICATIONS

This application claims the priority benefit of Korean Patent Application No. 2008-0125000, filed on Dec. 10, 2008 in the Korean Intellectual Property Office, the disclosure of which is incorporated herein by reference.

BACKGROUND

1. Field

Embodiments relate to a robot and a controlling method thereof, and more particularly, to a robot generating a message unit using a robot hand, and a controlling method thereof.

2. Description of the Related Art

In general, a robot, as a device capable of automatically performing certain works or operations, has been utilized in various fields to replace and assist human beings.

Recently, humanoid robots acting and looking similar to human beings have been developed and applied in diverse industrial fields like other general industrial robots to perform difficult works substituting for human beings.

The greatest merit of the humanoid robots is in the friendly manner of supplying various services in the everyday life of human beings rather than in the substitution for human being.

For interaction between a user, that is the human being, and the humanoid robot, the user needs to input a desired command to the robot.

A speech recognition technology has been applied to an existing conventional robot so that the user and the robot can interactively talk. According to such a method, however, the speech understanding is actually restricted since a speech recognition capability is not satisfactory enough. Therefore, it is insufficient to supply various services.

On the other hand, there has been tried a method to input the user's command by equipping the robot with a touch screen, a keyboard or a wireless input device. However, the manufacturing cost should increase to dedicatedly equip those devices.

SUMMARY

In an aspect of exemplary embodiments, there is provided a robot generating a message using a robot hand, and a controlling method thereof.

In accordance with an aspect of an exemplary embodiment, there is provided a robot hand including a hand body part; and at least one finger part connected to the hand body part, wherein the hand body part or the finger part has a keyboard function.

The robot hand may further include a sensor unit that detects mechanical displacement thereof.

The sensor unit may include an encoder or a gyro sensor mounted to joints of the robot hand.

The robot hand may further include a sensor unit that detects electric displacements thereof.

The sensor unit may include any one of a touch sensor, a strain gauge and a torque sensor mounted to a surface of the robot hand.

In accordance with an aspect of an exemplary, there is provided a robot hand including a hand body part; at least one finger part connected to the hand body part; and a sensor unit equipped to the hand body part or the finger part to function as a keyboard.

The sensor unit may include an encoder or a gyro sensor which detects mechanical displacements and thereby outputs displacement signals.

The sensor unit may include at least one of a touch sensor, a strain gauge and a torque sensor detecting electric displacements and outputting displacement signals.

In accordance with an aspect of an exemplary embodiment, there is provided a robot including a robot hand including a hand body part and a finger part, any one of which has a keyboard function; and a command reading unit to generate a message according to displacement signals generated from the robot hand.

The displacement signals may be generated through mechanical or electric displacements of the robot hand.

The command reading unit may include a mapping information storage unit to store mapping information generated by matching the displacement signals to characters; a character generation unit to generate characters corresponding to the input displacement signals using the mapping information; and a message generation unit to generate a message using the generated characters.

The command reading unit may include a message storage unit that stores the generated message.

The robot may further include a sound outputting unit that outputs the generated message in the form of sound.

The robot may further include a displaying unit that displays the generated message.

In accordance with an aspect of an exemplary embodiment, there is provided a method to control a robot, including detecting displacements by a sensor mounted to a robot hand; generating characters corresponding to displacement signals of the sensor; and generating a message by combining the characters in order.

The method may further include outputting the generated message in the form of sound.

The method may further include displaying the generated message.

The method may further include storing the generated message.

The displacement signals may be output from the sensor that detects mechanical displacement of the robot hand.

The displacement signals may be output from the sensor that detects electric displacement of the robot hand.

BRIEF DESCRIPTION OF THE DRAWINGS

These and/or other aspects of exemplary embodiments will become apparent and more readily appreciated from the following description of exemplary embodiments, taken in conjunction with the accompanying drawings of which.

DETAILED DESCRIPTION

Figure 1:
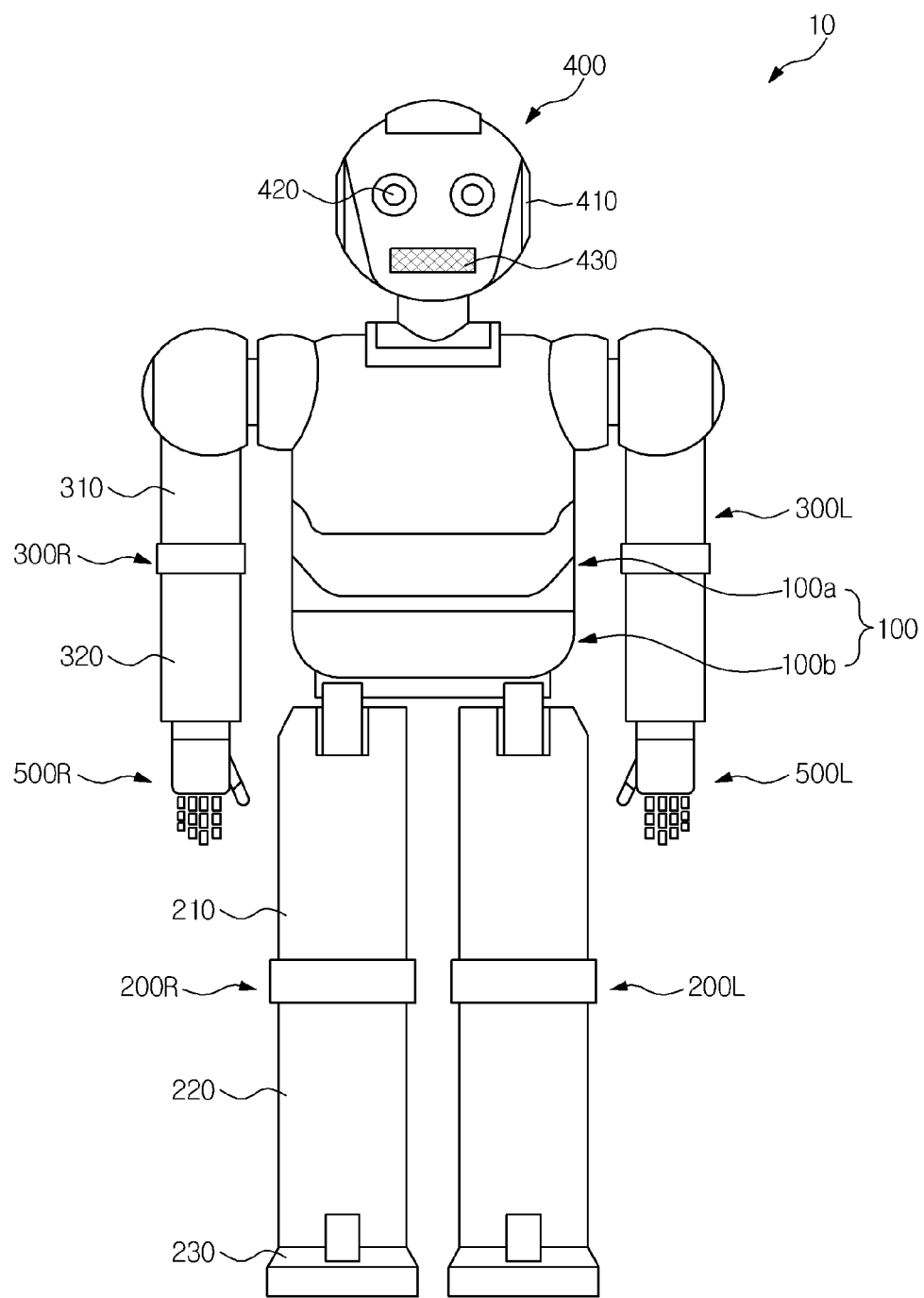
FIG. 1 is a view showing a robot according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

As shown in FIG. 1, a robot 10 according to an exemplary embodiment includes a robot body 100, legs 200R and 200L connected to lower both sides of the robot body 100, arms 300R and 300L connected to upper both sides of the robot body 100, and a head 400 connected to an upper end of the robot body 100. Here, the symbols "R" and "L" attached to the reference numerals refer to the right and the left, respectively.

The robot body 100 is divided into a chest part 100a and a waist part 100b. A joint may be mounted between the chest part 100a and the waist part 100b so that the chest part 100a is able to rotate relative to the waist part 100b.

The both legs 200R and 200L each comprise a thigh link 210, a lower leg link 220, and a foot 230.

The head 400 is formed at the upper part of the robot body 100. The head 400 comprises a photographing unit 420 taking pictures of around the robot 10, a sound sensing unit 410 detecting sounds, and a sound outputting unit 430 having a sound outputting function.

The both arms 300R and 300L each comprise an upper arm link 310, a lower arm link 320. Additionally, robot hands 500R and 500L are provided to the arms 300R and 300L, respectively.

Figure 3A:
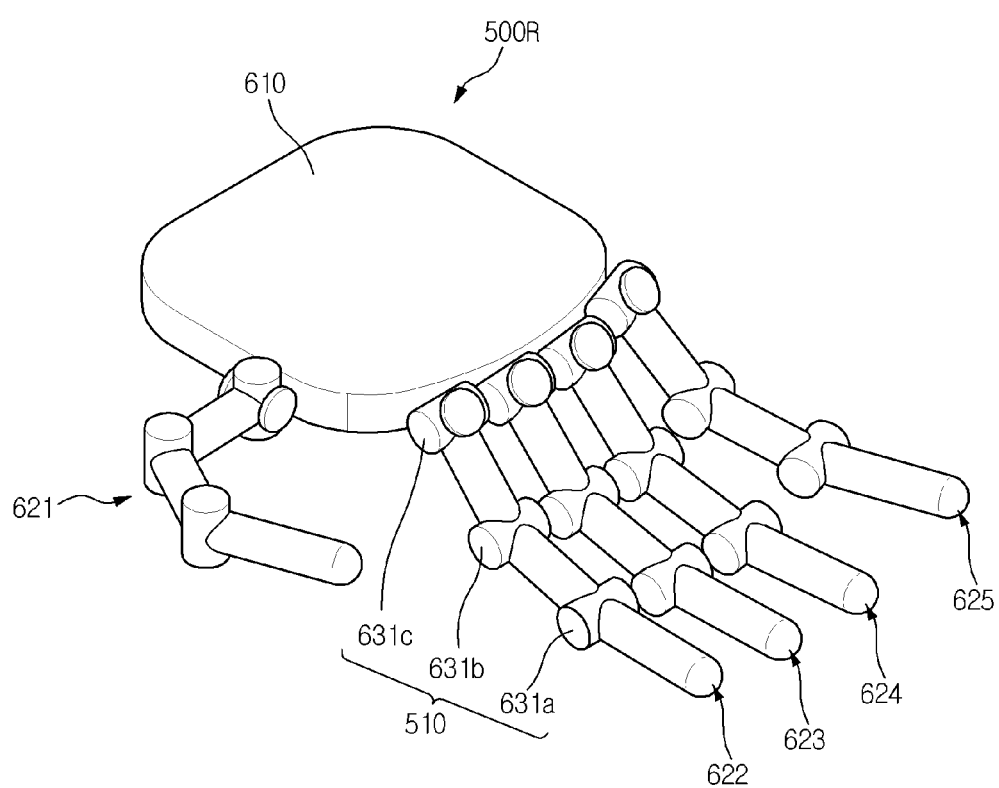
FIG. 3A is a view showing the structure of a robot hand according to an exemplary embodiment.

Referring to FIG. 3A, each of the robot hands has a sensor unit 510 to grip an object accurately and safely.

Furthermore, the sensor unit 510 has a keyboard function. To this end, according to an exemplary embodiment, encoders 631a, 631b and 631c may be adopted as will be explained with reference to FIG. 3A and FIG. 3B.

The robot hand 500R comprises a hand body part 610, and a plurality of finger parts 621, 622, 623, 624 and 625 connected to the hand body part 610. Each finger part includes internodes rotatably linked by joints. The encoders 631a, 631b and 631c are mounted to the joints to detect rotational states of the internodes of the finger parts. For example, the finger part 622 corresponding to an index finger of a human being includes the encoders 631a, 631b and 631c at every joint thereof, and the other finger parts have the encoders 631a, 631b and 631c in the same manner.

According to an exemplary embodiment, all the encoders 631a, 631b and 631c equipped to the both hands 500R and 500L are allocated with at least one letter, figure or sign so as to function as a keyboard.

Figure 3B:
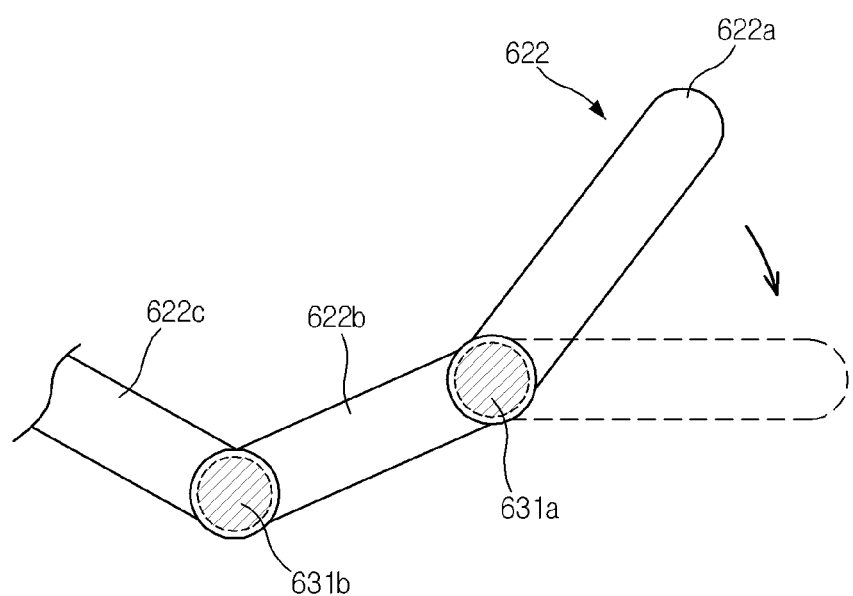
FIG. 3B is a view explaining the operation of the robot hand of FIG. 3A.

Referring to FIG. 3B, when a user presses an internode 622a disposed nearest to a tip of the finger part 622, the internode 622a moves in a direction shown by an arrow. According to this, the encoder 631a mounted to the joint in connection with the internode 622a outputs a displacement signal. Additional internodes are denoted by reference numerals 622b and 622c.

Therefore, a character generation unit which will be explained later recognizes the letter, figure or sign allocated to the corresponding internode 622a.

By repeating those processes, the robot combines recognized characters from the respective processes, thereby generating a message. Here, in order to help the user more easily recognize and input the characters, the characters may be marked on corresponding internodes of the finger parts.

Although the encoders 631a, 631b and 631c are used as the sensor unit 510 to detect mechanical displacements of the finger parts, exemplary embodiments not limited to this but may apply a gyro sensor capable of detecting mechanical displacements as equipped to the joints.

Such a keyboard function may be achieved by a touch sensor that detects electric displacements.

Figure 4A:
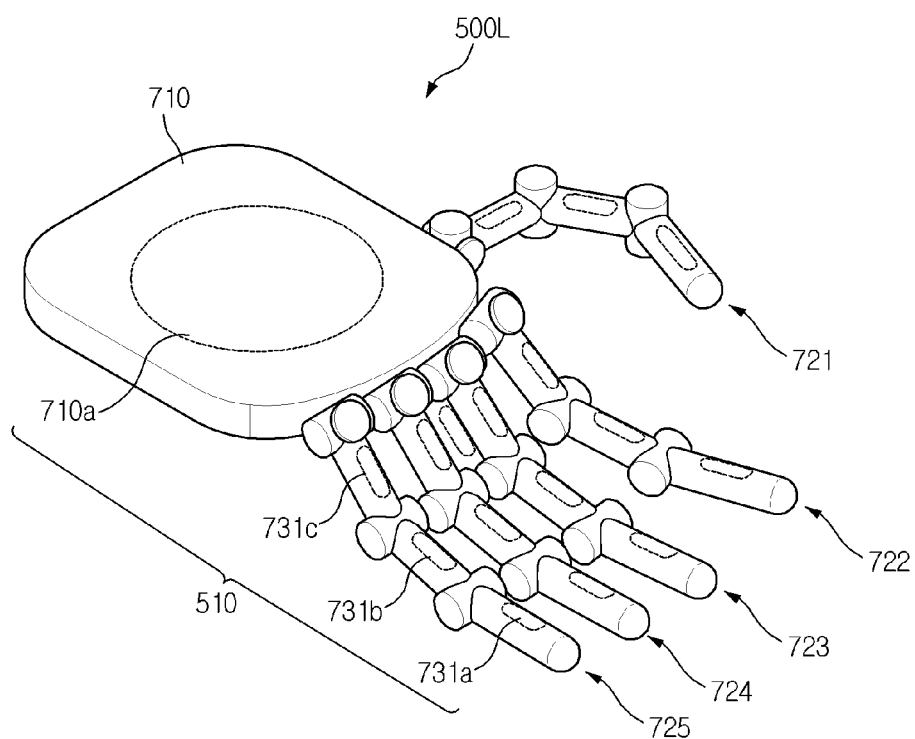
FIG. 4A is a view showing the structure of a robot hand according to an exemplary embodiment.

As shown in FIG. 4A, the robot hand 500L comprises a hand body part 710, and a plurality of finger parts 721, 722, 723, 724 and 725 connected to the hand body part 710. Each of the finger parts 721, 722, 723, 724 and 725 is includes internodes rotatably linked by joints.

Additionally, touch sensors are mounted to the hand body part 710 or the finger parts 721, 722, 723, 724 and 725. The touch sensor may be further mounted to any other part of the robot hand or the inside of the robot as long as giving easy access to the user.

For example, a touch sensor 710a may be mounted to the hand body part 710 whereas touch sensors 731a, 731b and 731c are mounted to all joints of a fifth finger part 725 corresponding to a little finger of a human being. The other finger parts may have the touch sensors at each joint in the same manner.

Figure 4B:
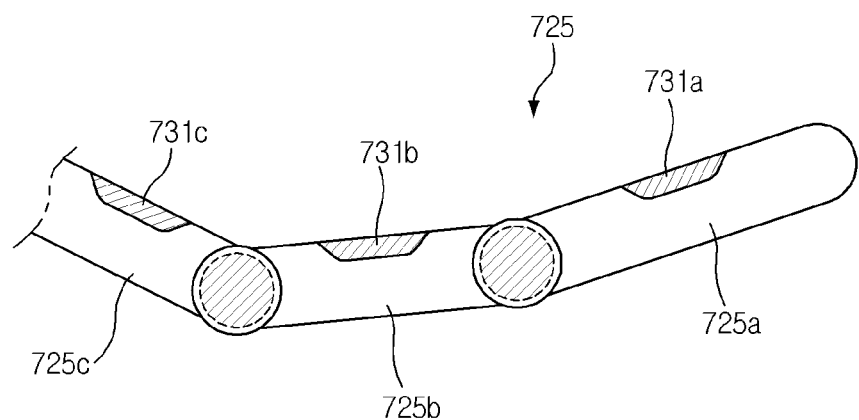
FIG. 4B is a view explaining the operation of the robot hand of FIG. 4A.

Referring to FIG. 4B, when the user touches any one of the touch sensors 731a, 731b and 731c mounted to internodes 725a, 725b and 725c of the finger parts, the touch sensor touched by the user outputs displacement signals in response to electric displacements. Accordingly, the character generation unit that will be explained later recognizes the letter, figure or sign allocated to the corresponding internode.

In addition, by repeating those processes, the robot combines recognized characters from the respective processes, thereby generating a message. Here, in order to help the user more easily recognize and input the characters, the characters may be marked on corresponding internodes of the finger parts.

Although the touch sensors are used as the sensor unit 510 to detect the electric displacements, exemplary embodiments are not limited to this but may apply a strain gauge or a torque sensor capable of detecting the electric displacements.

Figure 5:
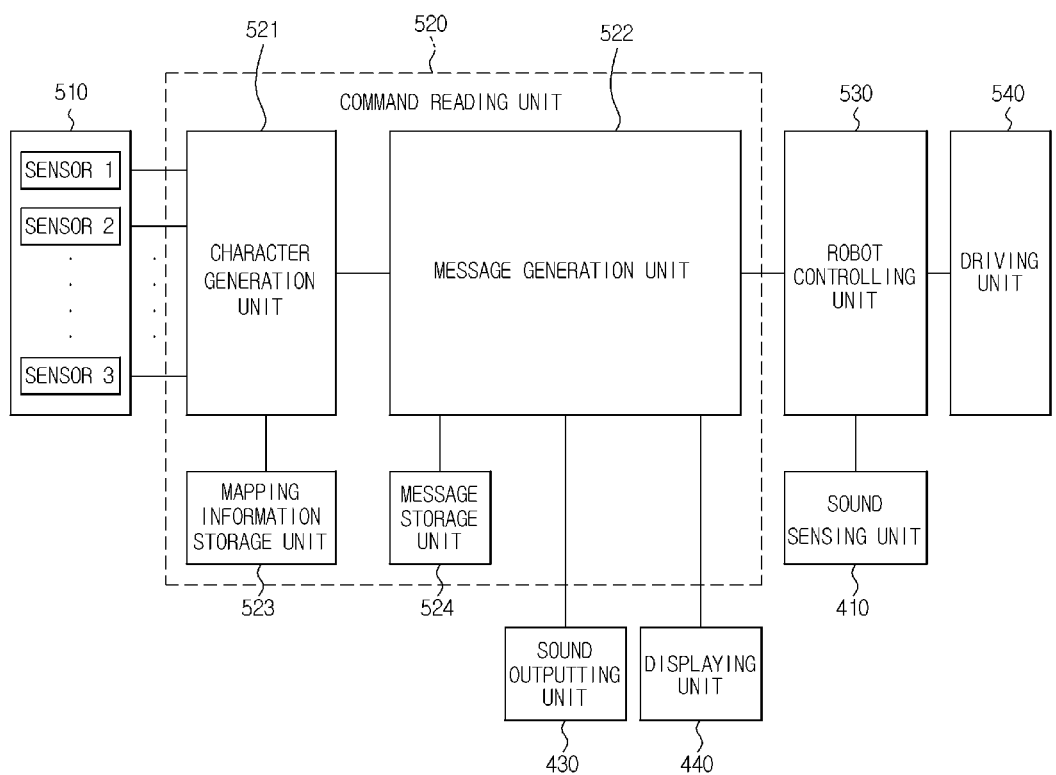
FIG. 5 is a control block diagram of the robot according to exemplary embodiments.

FIG. 5 is a control block diagram of the robot according to an exemplary embodiment.

According to an exemplary embodiment, the robot comprises the sensor unit 510, a command reading unit 520 reading a command input from the sensor unit 510 and outputting the command in the form of a message, a robot controlling unit 530 controlling the operations of the robot according to messages received from the command reading unit 520, and a driving unit 540 operating various actuators of the robot under the control of the robot controlling unit 530.

Figure 7:
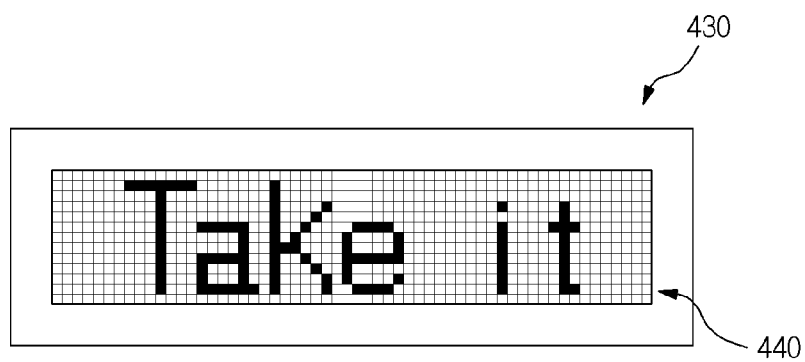
FIG. 7 is a view explaining a displaying unit of the robot according to exemplary embodiments.

Moreover, the robot further comprises the sound outputting unit 430 and a displaying unit 440 enabling the user to audibly and visually understand the message input state. As shown in FIG. 7, the displaying unit 440 may be mounted within the sound outputting unit 430 to display generated message.

The command reading unit 520 comprises a character generation unit 521, a message generation unit 522, a mapping information storage unit 523, and a message storage unit 524. The mapping information storage unit 523 stores mapping information generated by matching the displacement signals of the respective sensors to the characters. Here, the displacement signals refer to the mechanical displacement, for example of the encoders, or the electric displacement for example of the touch sensors.

The character generation unit 521 generates characters using the displacement signals input from the sensor unit 510 and the mapping information stored in the mapping information storage unit 523, and supplies the generated characters to the message generation unit 522.

The message generation unit 522 generates a message by the input characters, and more specifically, generates a message using a message reading engine that combines the characters and creates a message sentence by sentence. The message generation unit 522 analyzes the message, and supplies the message to the robot controlling unit 530 or stores the message in the message storage unit 524. In addition, the message generation unit 522 supplies sound message signals to output the message in the sound form to the sound outputting unit 430. The sound outputting unit 430 outputs sounds according to the sound message signals so that the user can check the input message.

Hereinafter, a method to control the above robot will be explained.

The robot according to an exemplary embodiment is capable of performing its functions as the user inputs a message corresponding to a desired command through the robot hand.

Figure 2:
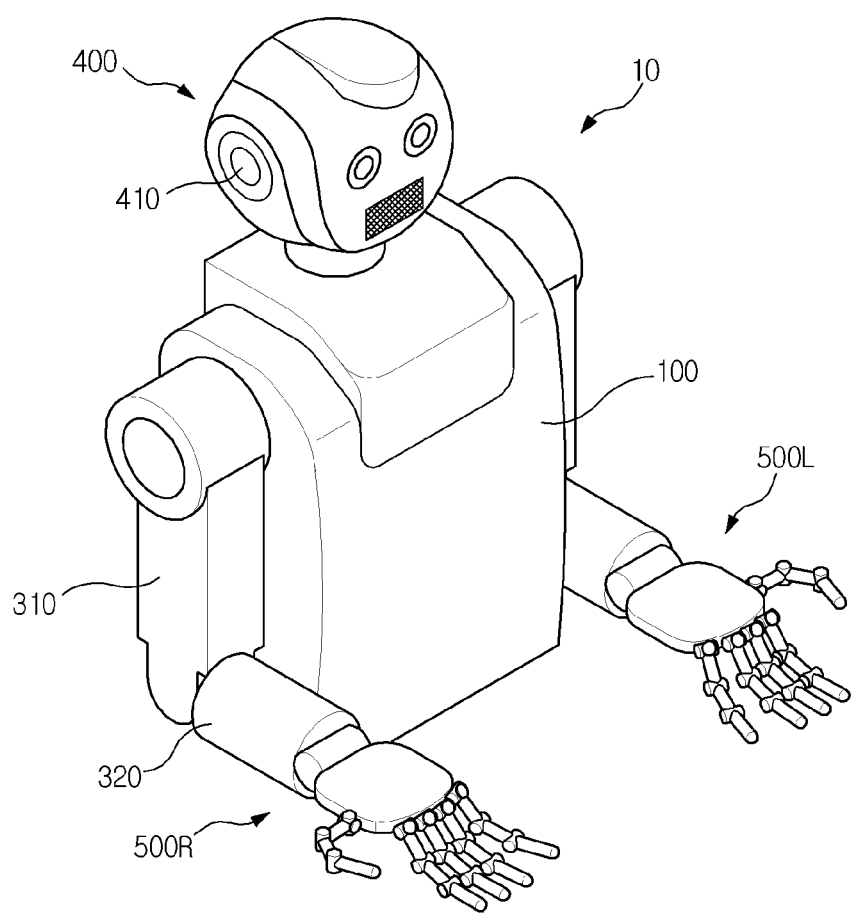
FIG. 2 is a view explaining the operation of inputting a message using the robot of FIG. 1.
Figure 6:
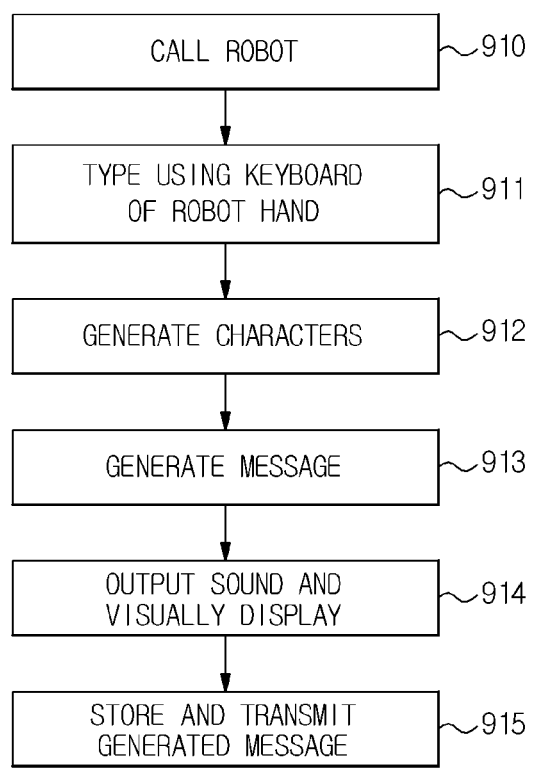
FIG. 6 is a flow chart illustrating a method to control the robot according to exemplary embodiments.

Referring to FIG. 6, the user calls the robot 10 loudly in order to input the message to the robot 10. Then, the sound sensing unit 410 of the robot 10 applies a sound signal to the robot controlling unit 530. In response to the call, the robot controlling unit 530 controls the driving unit 540 so that the robot 10 raises the both robot hands 500R and 500L as shown in FIG. 2. At this time, the robot hands 500R and 500L are opened with palms up such that the user feels friendly with the robot (operation 910).

Next, the user types characters to input the desired message using the sensor unit 510 functioning as a keyboard equipped to the robot hands 500R and 500L. According to this input, the sensor unit 510 supplies displacement signals to the command reading unit 520. Herein, the typing may include operations accompanied by mechanical or electric displacements (operation 911).

The character generation unit 521 generates characters in accordance with the displacement signals using the mapping information (operation 912). The message generation unit 522 generates the message corresponding to the generated characters (operation 913).

Simultaneously, the sound outputting unit 430 outputs the message being generated in the form of sound. Also, the displaying unit 440 displays the message for the user's convenient confirmation (operation 914).

Next, the generated message is stored in the message storage unit 524 and transmitted to the robot controlling unit 530 (operation 915).

As described above, input of a command to a robot can be achieved through a robot hand equipped with a keyboard function. Accordingly, convenience of the input operation and friendliness with the robot can be much improved.

In addition, since the command input is performed through a sensor unit equipped in the robot hand, there is no need to add a dedicated device for interaction with the robot. As a result, the manufacturing cost can be reduced.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A humanoid robot hand comprising:
   a hand body part; and
   at least one finger part connected to the hand body part,
   wherein the hand body part or the finger part has a keyboard function used to input commands through the humanoid robot hand.

2. The humanoid robot hand according to claim 1, further comprising a sensor unit that detects mechanical displacement thereof.

3. The humanoid robot hand according to claim 2, wherein the sensor unit comprises an encoder or a gyro sensor mounted to joints of the robot hand.

4. The humanoid robot hand according to claim 1, further comprising a sensor unit that detects electric displacements thereof.

5. The humanoid robot hand according to claim 4, wherein the sensor unit comprises any one of a touch sensor, a strain gauge and a torque sensor mounted to a surface of the humanoid robot hand.

6. A humanoid robot hand comprising:
   a hand body part;
   at least one finger part connected to the hand body part; and
   a sensor unit equipped to the hand body part or the finger part to function as a keyboard used to input commands through the humanoid robot hand.

7. The humanoid robot hand according to claim 6, wherein the sensor unit comprises an encoder or a gyro sensor which detects mechanical displacements and thereby outputs displacement signals.

8. The humanoid robot hand according to claim 6, wherein the sensor unit comprises at least one of a touch sensor, a strain gauge and a torque sensor detecting electric displacements and outputting displacement signals.

9. A humanoid robot comprising:
   a humanoid robot hand constituted by a hand body part and a finger part, any one of which has a keyboard function; and
   a command reading unit generating a message according to displacement signals generated from the humanoid robot hand.

10. The humanoid robot according to claim 9, wherein the displacement signals are generated through mechanical or electric displacements of the humanoid robot hand.

11. The humanoid robot according to claim 9, wherein the command reading unit comprises:
    a mapping information storage unit storing mapping information generated by matching the displacement signals to characters;
    a character generation unit generating characters corresponding to the input displacement signals using the mapping information; and
    a message generation unit generating a message using the generated characters.

12. The humanoid robot according to claim 9, wherein the command reading unit includes a message storage unit that stores the generated message.

13. The humanoid robot according to claim 9, further comprising a sound outputting unit that outputs the generated message in the form of sound.

14. The humanoid robot according to claim 9, further comprising a displaying unit that displays the generated message.

15. A method to control a humanoid robot, comprising:
    detecting displacements by a sensor mounted to a humanoid robot hand;

generating characters corresponding to displacement signals of the sensor; and generating a message by combining the characters in order.

16. The method to control the humanoid robot according to claim 15, further comprising outputting the generated message in the form of sound.

17. The method to control the humanoid robot according to claim 15, further comprising displaying the generated message.

18. The method to control the humanoid robot according to claim 15, further comprising storing the generated message.

19. The method to control the humanoid robot according to claim 15, wherein the displacement signals are output from the sensor that detects mechanical displacement of the humanoid robot hand.

20. The method to control the humanoid robot according to claim 15, wherein the displacement signals are output from the sensor that detects electric displacement of the humanoid robot hand.

* * * * *